US012744326B2

(12) United States Patent
Muranaka et al.

(10) Patent No.: US 12,744,326 B2
(45) Date of Patent: Sep. 22, 2026

(54) RADIO WAVE ABSORBER FOR HIGH-FREQUENCY COMMUNICATION DEVICE

(71) Applicant: NIFCO INC., Yokosuka (JP)

(72) Inventors: Makoto Muranaka, Yokosuka (JP); Tatsuro Fujiu, Yokosuka (JP)

(73) Assignee: NIFCO INC., Yokosuka (JP)

( * ) Notice: Subject to any disclaimer, the term of this patent is extended or adjusted under 35 U.S.C. 154(b) by 273 days.

(21) Appl. No.: 18/696,837

(22) PCT Filed: Dec. 2, 2022

(86) PCT No.: PCT/JP2022/044615

§ 371 (c)(1),
(2) Date: Mar. 28, 2024

(87) PCT Pub. No.: WO2023/127404

PCT Pub. Date: Jul. 6, 2023

(65) Prior Publication Data

US 2024/0413542 A1 Dec. 12, 2024

(30) Foreign Application Priority Data

Dec. 28, 2021 (JP) ................................ 2021-214863

(51) Int. Cl.
*H01Q 17/00* (2006.01)

(52) U.S. Cl.
CPC ................................ *H01Q 17/002* (2013.01)

(58) Field of Classification Search
CPC .................................................. H01Q 17/002

(Continued)

(56) References Cited

U.S. PATENT DOCUMENTS

2002/0067313 A1* 6/2002 Kondoh .................... H01P 1/16
257/E23.114
2003/0146866 A1* 8/2003 Hayashi ............... H01Q 17/008
342/4

(Continued)

FOREIGN PATENT DOCUMENTS

JP S52106048 U 8/1977
JP S58-34602 A 3/1983

(Continued)

OTHER PUBLICATIONS

Japan Patent Office, Notice of Reasons for Refusal for Japanese Patent Application No. 2021-214863 mailed on May 27, 2025; 6 pp.

(Continued)

*Primary Examiner* — Samarina Makhdoom
(74) *Attorney, Agent, or Firm* — HAUPTMAN HAM, LLP

(57) ABSTRACT

Provided is a radio wave absorber for a high-frequency communication apparatus that can improve mass productivity, reduce costs, and further achieve weight reduction. For this purpose, a radio wave absorber includes a side part surrounding a semiconductor element fixed to a base part provided in a high-frequency communication apparatus and a top part closing an open face surrounded by the side part. An inner face of the top part is provided with a plurality of protruding parts protruding toward the semiconductor element positioned inside the radio wave absorber, positioned spaced apart from the semiconductor element, and periodically arranged. The protruding parts are formed to be tapered toward the semiconductor element and are integrally molded of a synthetic resin.

20 Claims, 7 Drawing Sheets

(58) Field of Classification Search
USPC .............................................................. 342/1
See application file for complete search history.

(56) References Cited

U.S. PATENT DOCUMENTS

| | | | | |
|---|---|---|---|---|
| 2004/0084196 | A1* | 5/2004 | Hogberg | H05K 9/0029 206/723 |
| 2020/0021036 | A1* | 1/2020 | Mikami | H01Q 17/008 |
| 2020/0253096 | A1 | 8/2020 | Mcbain et al. | |

FOREIGN PATENT DOCUMENTS

| | | | | | |
|---|---|---|---|---|---|
| JP | 2004-022685 | A | | 1/2004 | |
| JP | 3739230 | B2 | | 1/2006 | |
| JP | 2019190928 | A | * | 10/2019 | |
| JP | 2021-536126 | A | | 12/2021 | |
| WO | WO-2020041320 | A1 | * | 2/2020 | H10W 42/20 |

OTHER PUBLICATIONS

PCT/ISA/210, “International Search Report for PCT International Application No. PCT/JP2022/044615,” Feb. 14, 2023.

* cited by examiner

RADIO WAVE ABSORBER FOR HIGH-FREQUENCY COMMUNICATION DEVICE

FIELD OF THE INVENTION

The present invention relates to a radio wave absorber for a high-frequency communication device, which can improve mass productivity, reduce costs, and further achieve weight reduction.

BACKGROUND OF THE INVENTION

Conventionally, technologies are known for a radio wave absorber for reducing interference by unwanted radiated radio waves in microwaves and millimeter waves, wherein protrusions and recesses are provided inside a casing (refer to Patent Literature 1 and Patent Literature 2).

As the conventional protrusions and recesses described above, for example, a high-frequency communication apparatus provided with metallic protrusions protruding from a ceiling part of a lid of a casing is known (refer to Paragraph and FIG. 1 and FIG. 4 of Patent Literature 1).

In addition, Patent Literature 1 states that the protrusions may be formed of a nonmetal separately from the metallic lid, and the surface thereof may be covered with a metallic film by plating or the like (refer to Paragraph of Patent Literature 1).

Furthermore, the metallic lid described above is formed separately from a base plate by side walls of the casing, and as the side walls, metals and nonmetals such as glass and alumina are exemplified (refer to Paragraph and FIG. 1 of Patent Literature 1).

Meanwhile, as the conventional protrusions and recesses, for example, a radio wave absorber having protrusions and recesses on one face of a radio wave absorbing layer dispersed and mixed with ferrite and carbonyl iron is known (refer to Lines 1 to 11, the upper left column, Page 2 and FIG. 3 (A) of Patent Literature 2).

CITATION LIST

Patent Literature

Patent Literature 1: Japanese Patent No. 3739230

Patent Literature 2: Japanese Patent Application Laid-open No. S58-034602

SUMMARY

Technical Problem

The conventional protrusions and recesses described above (refer to Patent Literature 1 and Patent Literature 2) require metal or metallic plating, causing a first problem in that there is a room for improvement in terms of mass productivity, costs, and weight reduction.

Meanwhile, in the conventional high-frequency communication apparatus (refer to Patent Literature 1), the side walls and the base plate of the casing are separate, thus requiring installation of the side walls and the base plate and further screwing or the like of both of them, which causes a second problem in that the installation workability of the apparatus is bad.

The present invention has been made focusing on the first problem described above. By forming protruding parts tapered toward a semiconductor element and integrally molding them of a synthetic resin, the absorption characteristics of unwanted radiated radio waves can be obtained even with the protruding parts made of resin as in the conventional metallic protrusions.

In addition, the present invention has been made focusing on the second problem described above. By integrally forming an engaging part for mounting a base part in a side part, the base part can be mounted simply and quickly using the engaging part of the side part.

Solution to Problem

A radio wave absorber according to an aspect of the present invention is a radio wave absorber for a high-frequency communication apparatus absorbing unwanted radiated radio waves of a millimeter wave radar or the like to reduce radio wave interference with a semiconductor element inside the high-frequency communication apparatus, the radio wave absorber including a side part surrounding the semiconductor element fixed to a base part provided in the high-frequency communication apparatus and a top part closing an open face surrounded by the side part, an inner face of the top part being provided with a plurality of protruding parts protruding toward the semiconductor element positioned inside the radio wave absorber, positioned spaced apart from the semiconductor element, and periodically arranged, and the protruding parts being formed tapered toward the semiconductor element and being integrally molded of a synthetic resin.

In the radio wave absorber according to an aspect of the present invention, in the radio wave absorber, the protruding parts may protrude in a regular polygonal pyramidal shape or a conical shape toward the semiconductor element.

In the radio wave absorber according to an aspect of the present invention, in the radio wave absorber, the top part and the protruding parts may be integrally molded of a synthetic resin.

In the radio wave absorber according to an aspect of the present invention, in the radio wave absorber, the top part, the protruding parts, and the side part may be integrally molded of a synthetic resin.

In the radio wave absorber according to an aspect of the present invention, in the radio wave absorber, the side part may be provided with an engaging part for mounting on the base part.

In the radio wave absorber according to an aspect of the present invention, in the radio wave absorber, the protruding parts may have a protruding height from the inner face of the top part to a tip part of 0.1 mm or more and 2.0 mm or less.

In the radio wave absorber according to an aspect of the present invention, the radio wave absorber may have a relative permittivity of its material of 4 or more and 26 or less.

Advantageous Effects of the Invention

According to an aspect of the present invention, by forming the protruding parts tapered toward the semiconductor element and integrally molding them of the synthetic resin, the absorption characteristics of unwanted radiated radio waves can be obtained even with the protruding parts made of resin as in the conventional metallic protrusions.

According to an aspect of the present invention, the mass productivity of the radio wave absorber can be improved, costs can be reduced, and further weight reduction can be achieved as compared with conventional metallic protrusions.

Furthermore, according to an aspect of the present invention, by making the protruding parts made of resin, they are not affected by oxidation, and variations in mass production and changes with time of the radio wave absorber can be reduced.

DESCRIPTION OF EMBODIMENTS

Embodiment

Figure 1:
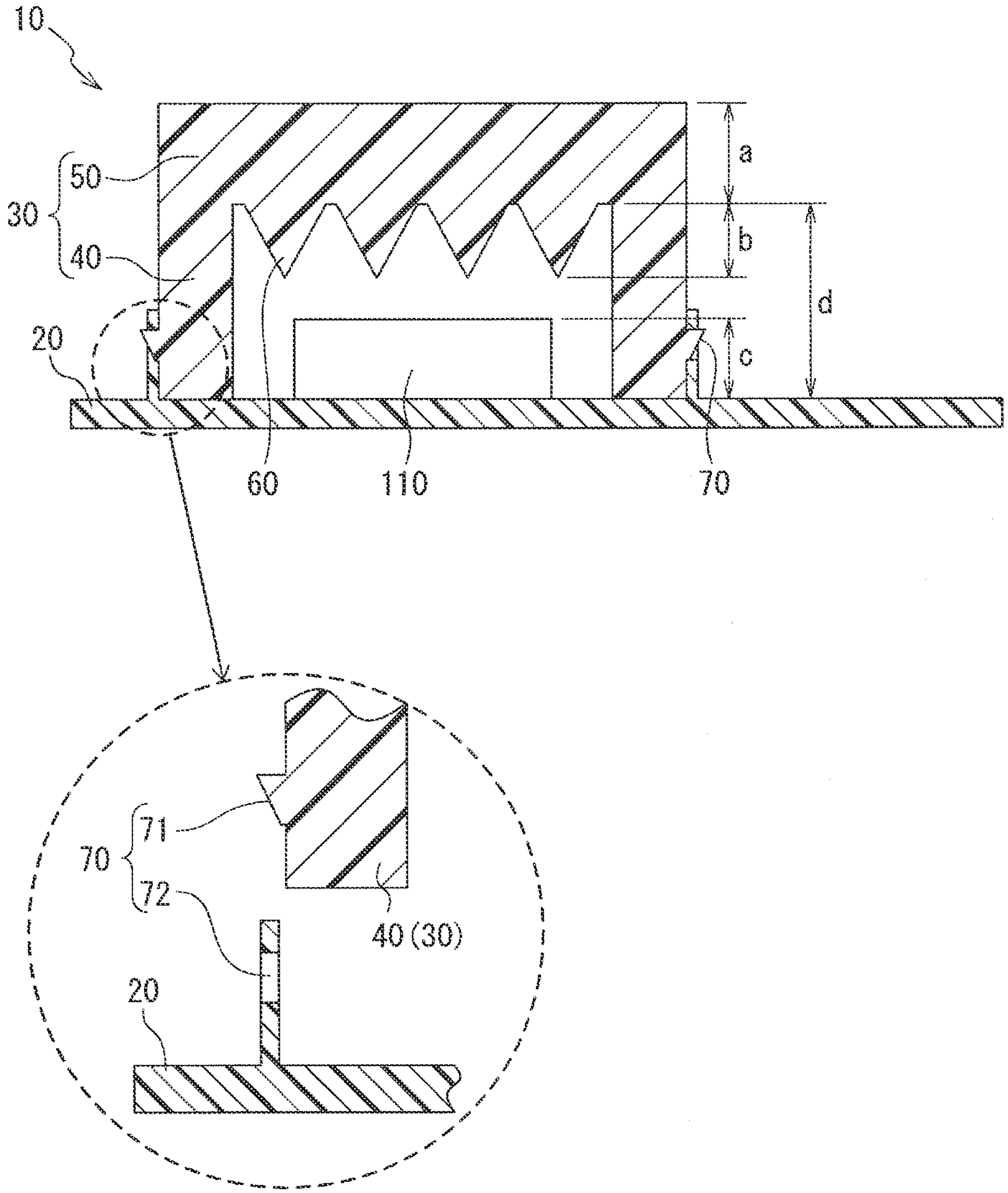
FIG. 1 is a sectional view of a radio wave absorber, relating to an embodiment of the present invention.

The following describes an embodiment of the present invention mainly with reference to FIG. 1.

The drawings are schematic, and the relation between thickness and plan dimensions, the ratio between the thicknesses of the layers, and the like are different from the actual ones. The embodiment presented below exemplifies configurations to embody the technical concept of the present invention, and the technical concept of the present invention does not specify the materials, shapes, structures, and the like of the components to those described below. The technical concept of the present invention is within the technical scope defined by the claims, and various changes can be made.

(Radio Wave Absorber 10)

Figure 2:
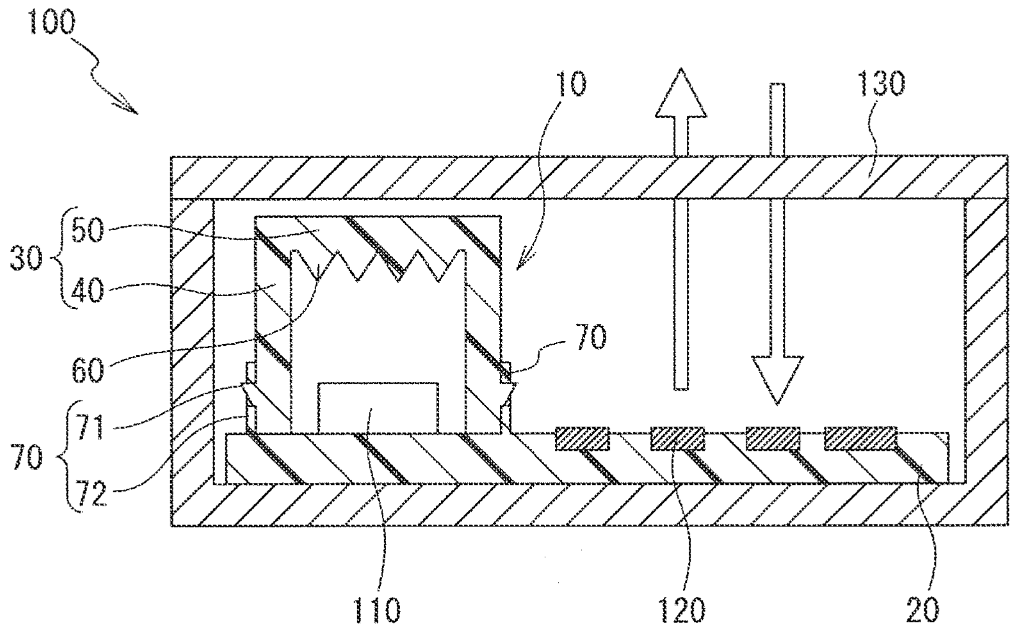
FIG. 2 is a sectional view of part of a high-frequency communication apparatus, corresponding to FIG. 1.
Figure 10:
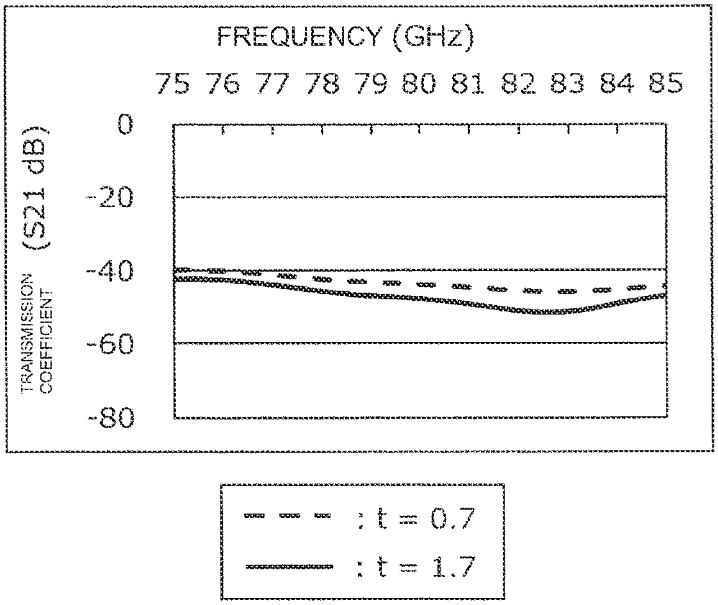
FIG. 10 is a chart for describing the relation between a transmission coefficient and the frequency about the height of the protruding parts, relating to the embodiment of the present invention.

In FIG. 1 and FIG. 2, 10 is a radio wave absorber, and the radio wave absorber 10 is used for a high-frequency communication apparatus 100 and is used for a component against radio wave noise protecting a processing chip inside a millimeter wave radar.

The "millimeter wave" here is a concept including millimeter waves, sub-millimeter waves, or microwaves.

The radio wave absorber 10 broadly includes the following parts.

The following (1) will be described below.

(1) Radio Wave Absorbing Member 30

The radio wave absorber 10 is not limited to (1) described above, and a base part 20 and the radio wave absorbing member 30 may be integrally formed, for example.

As illustrated in FIG. 2, the high-frequency communication apparatus 100 broadly includes the following parts apart from the radio wave absorber 10.

The following (1) to (3) will be described below.

(1) Semiconductor element 110

(2) Antenna 120

(3) Radome 130

The high-frequency communication apparatus 100 is not limited to (1) to (3) described above and may include, for example, wiring or the like electrically connecting the semiconductor element 110 to the antenna 120.

(Radio Wave Absorbing Member 30)

As illustrated in FIG. 1 to FIG. 6, the radio wave absorbing member 30 broadly includes the following parts.

The following (1) to (4) will be described below.

(1) Side part 40

(2) Top part 50

(3) Protruding parts 60

(4) Engaging part 70

The radio wave absorbing member 30 is not limited to (1) to (4) described above, and the top part 50 and the protruding parts 60 may be integrally molded of a synthetic resin or the top part 50, the protruding parts 60, and the side part 40 may be integrally molded of a synthetic resin, for example. For the engaging part 70, one of the side part 40 and the base part 20 may be inserted and fixed to the other.

(Base Part 20)

As illustrated in FIG. 1 and FIG. 2, the base part 20 can fix the semiconductor element 110. The base part 20 is plate-like, and the whole or part thereof is integrally molded of a synthetic resin.

The synthetic resin is not limited in its material and is only required to have certain rigidity.

In addition, the base part 20 may be, not a single layer, printed boards stacked in a multilayered manner, for example.

(Radio Wave Absorbing Member 30)

As illustrated in FIG. 1 to FIG. 5, the radio wave absorbing member 30 is positioned above the semiconductor element 110 fixed to the base part 20 to surround and cover the semiconductor element 110.

The radio wave absorbing member 30 has a hollow box shape, the lower face of which opens toward the base part 20 and the whole or part of which is integrally molded of a synthetic resin.

The synthetic resin is not limited in its material and is only required to have rigidity necessary as the radio wave absorber 10.

In addition, the radio wave absorbing member 30 may be fixed to the radome 130, although not illustrated in the drawings.

(Side Part 40)

As illustrated in FIG. 1 to FIG. 5, the side part 40 forms part of the radio wave absorbing member 30, is provided to the base part 20, and surrounds the semiconductor element 110. The side part 40 is positioned on four sides of the semiconductor element 110, and parts of the side part 40 positioned on the respective four sides are plate-like and integrally molded of a synthetic resin, forming some spacing between the semiconductor element 110 and the top part 50.

The synthetic resin is not limited in its material and is only required to have rigidity necessary as the radio wave absorber 10.

The four parts of the side part 40 positioned on the respective four sides may be integrally molded, or the four parts may be individually molded, and an adhesive or the like may be applied thereto, for example.

(Top Part 50)

As illustrated in FIG. 1 to FIG. 5, the top part 50 closes an open face surrounded by the side part 40, is plate-like, and is integrally molded of a synthetic resin.

The synthetic resin is not limited in its material and is only required to have rigidity necessary as the radio wave absorber 10.

(Protruding Parts 60)

As illustrated in FIG. 1, FIG. 3, FIG. 4, and FIG. 5, the protruding parts 60 include a plurality of protruding parts 60 protruding toward the semiconductor element 110 positioned inside the radio wave absorber 10, positioned spaced apart from the semiconductor element 110, and periodically arranged.

The protruding parts 60 are formed to taper toward the semiconductor element 110 and are integrally molded of a synthetic resin.

The protruding parts 60 protrude in a regular polygonal pyramidal shape or a conical shape toward the semiconductor element 110.

Examples of the regular polygonal pyramidal shape include a regular triangular pyramid, a regular tetragonal pyramid (what is called a pyramidal shape), and a regular pentagonal pyramid. In the present embodiment, the regular tetragonal pyramidal shape is selected.

(High-Frequency Communication Apparatus 100) The high-frequency communication apparatus 100 illustrated in FIG. 2 is used for, for example, forward radars and backward radars of automobiles, although not illustrated in the drawing.

(Antenna 120)

As illustrated in FIG. 2, the antenna 120 is provided on a surface of the base part 20 and is electrically connected to the semiconductor element 110, although not illustrated in the drawing. The position of the antenna 120 is limited to the surface of the base part 20 and may be provided on the back side of the base part 20.

Meanwhile, the antenna 120 is positioned outside the radio wave absorbing member 30.

On the other hand, the semiconductor element 110 is positioned inside the radio wave absorbing member 30, and thus a through hole passing through inside and outside may be formed in the radio wave absorbing member 30.

(Radome 130)

As illustrated in FIG. 2, the radome 130 is a case transmitting radio waves and surrounds the entire radio wave absorbing member 30. The radio wave absorbing member 30 and the antenna 120 are positioned inside the radome 130.

The radome 130 is formed of, for example, a "PBT resin" with a dielectric constant of, for example, "5" and a thickness of, for example, "1 mm." The "PBT resin" as the material of the radome 130 and "5" as the dielectric constant thereof have been exemplified, but they are not limiting.

The shape of the protruding parts 60 is, for example, a "cone" and has a height of "1.5 mm." The spacing between adjacent protruding parts 60, that is, the spacing between the protruding parts 60 adjacent in the left-and-right direction when viewing the drawing and in the thickness direction of the drawing is, for example, "1 mm."

For the "cone" as the shape of the protruding parts 60, "1.5 mm" as the height thereof, and "1 mm" as the spacing between the adjacent protruding parts 60 have been exemplified, but they are not limiting.

(Dimensions of Respective Parts in FIG. 1)

The following describes dimensions "a" to "d" of the respective parts in FIG. 1. The dimensions "a" to "d" of the respective parts are as follows.

(1) "a" is the thickness of the base part 20, which is, for example, "1.5 mm."

(2) "b" is the thickness of the protruding parts 60, which is, for example, "1.0 mm."

The thickness of the protruding parts 60 is preferably "0.1 mm" or more and "2.0 mm" or less.

This is because if the protruding height is less than 0.1 mm, it is difficult to fill a recess of a mold with resin 100% during injection molding. A height d of the gap between the base part 20 and the top part 50 is preferably 2/2 or less; for ">=76.5 GHZ," λ is "4 mm" and h is "2 mm."

Thus, if the thickness of the protruding parts 60 exceeds "2.0 mm," the protruding parts 60 cannot be placed within the height d of the gap. The height d of the protruding parts 60 is preferably 1.0 mm or less.

The height d of the protruding parts 60 is more preferably 0.1 mm or more and 1.0 mm or less.

(3) "c" is the thickness of the semiconductor element 110, which is, for example, 1.0 mm.

The thickness of the semiconductor element 110 is preferably 0.1 mm or more and 1.0 mm or less.

(4) "d" is the height of the gap between the base part 20 and the top part 50, which is, for example, 2.0 mm.

The height d of the gap is preferably 22 or less; for A=76.5 GHZ, 2 is 4 mm and d is 2 mm.

The dimensions "a" to d of the respective parts are not limited to the distance and the thicknesses presented in the examples.

(Engaging Part 70)

As illustrated in FIG. 1 to FIG. 4, the engaging part 70 includes a locking claw 71 and an engaging hole 72.

Figure 3:
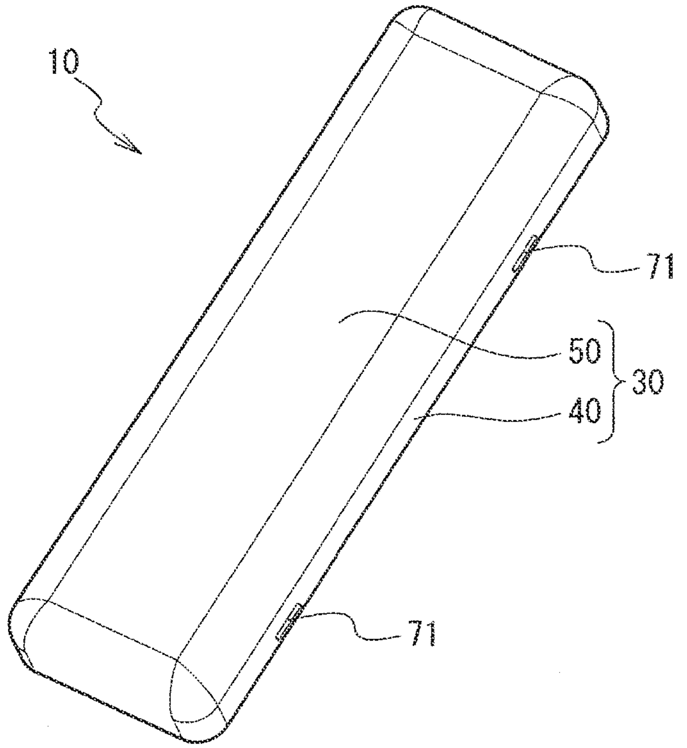
FIG. 3 is a perspective view of the radio wave absorber, relating to the embodiment of the present invention.
Figure 4:
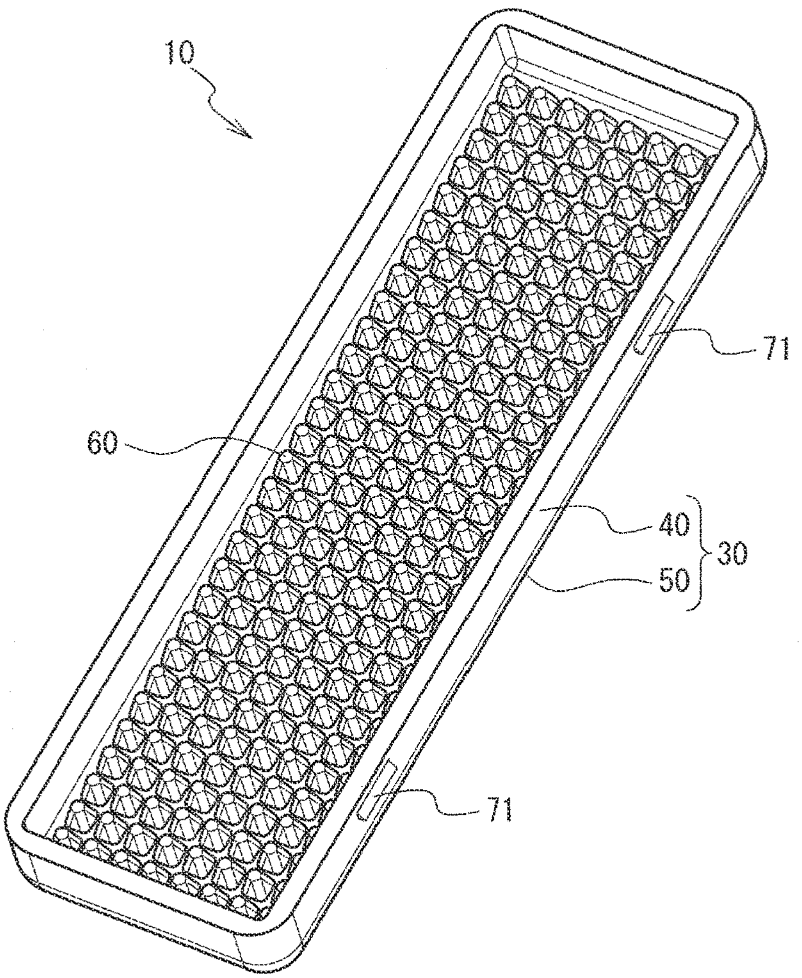
FIG. 4 is a perspective view seeing the radio wave absorber in FIG. 3 from below.
Figure 5:
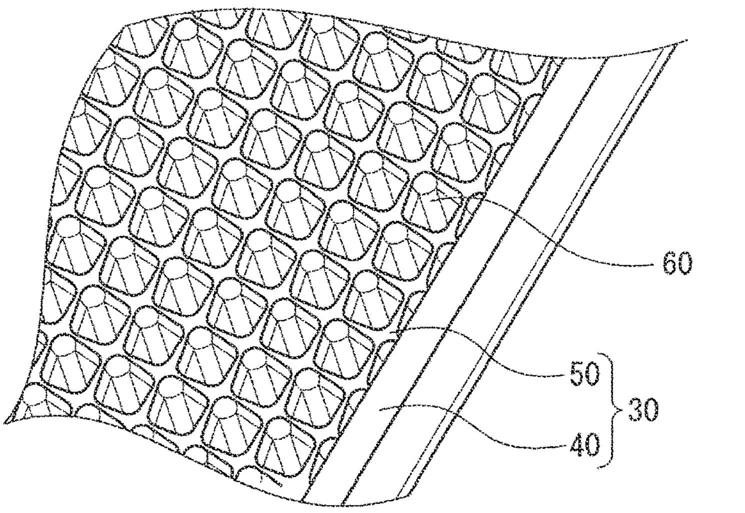
FIG. 5 is a perspective view with part of the radio wave absorber in FIG. 4 enlarged.

As illustrated in FIG. 1 and FIG. 2, the locking claw 71 protrudes from each of the left and right outer side faces of the side part 40. The locking claw 71 has a section with a slope facing downward, which protrudes in a right-angled triangle. As illustrated in FIG. 3 and FIG. 4, a pair of protruding locking claws 71 is also disposed at front and back positions.

As illustrated in FIG. 1 and FIG. 2, engaging holes 72 are parts into which respective locking claws 71 fit. The engaging hole 72 passing through a part, in a middle of its height protruding upward in a plate shape from the base part 20, in the thickness direction, and fitting with the locking claw 71, is formed.

When aligned with and fit onto the locking claw 71, the engaging hole 72 is pushed by the engaging hole 72 to be deflected in a direction in which they separate from each other due to the elasticity of resin. When the hole of the engaging hole 72 is positioned at the locking claw 71, the locking claw 71 snaps into place due to elastic restoring force. Consequently, the base part 20 is fixed to the side part 40 with one-touch action.

When the plate-like part protruding from the base part 20 is formed of a rigid member, the side part 40 formed of the synthetic resin may be deflected and engaged due to the elastic restoring force.

In the fixed state, the base part 20 can be removed from the side part 40 by disengaging the engaging holes 72 from the locking claws 71 using elasticity. The locking claws 71 may be provided in the base part 20, while the engaging holes 72 may be provided in the side part 40.

(Other Methods for Fixing Side Part 40 and Base Part 20 Together)

Examples of other methods for fixing the side part 40 and the base part 20 together include "pinching" and "thermal caulking" apart from the engaging part 70.

As the "pinching," for example, the side part 40 may be provided with protrusions protruding toward the base part 20, whereas the base part 20 may be provided with holes into which the protrusions fit in a non-return manner. To mount the base part 20 on the side part 40, the base part 20 can be fixed to the side part 40 by aligning the protrusions with the holes and fitting them together. In the fixed state, the base part 20 can be removed from the side part 40 by forcibly removing the protrusions from the holes. The protrusions may be provided in the base part 20, while the holes may be provided in the side part 40.

As the "thermal caulking," for example, the side part 40 may be provided with pillars protruding toward the base part 20, while through holes for the pillars to pass therethrough may be provided in the base part 20. To mount the base part 20 on the side part 40, the base part 20 can be fixed to the side part 40 by passing the pillars through the through holes to cause the pillars to protrude, melting the protruding ends with heat, and caulking them to a diameter larger than the through holes. The pillars may be provided in the base part 20, while the through holes may be provided in the side part 40.

Figure 6:
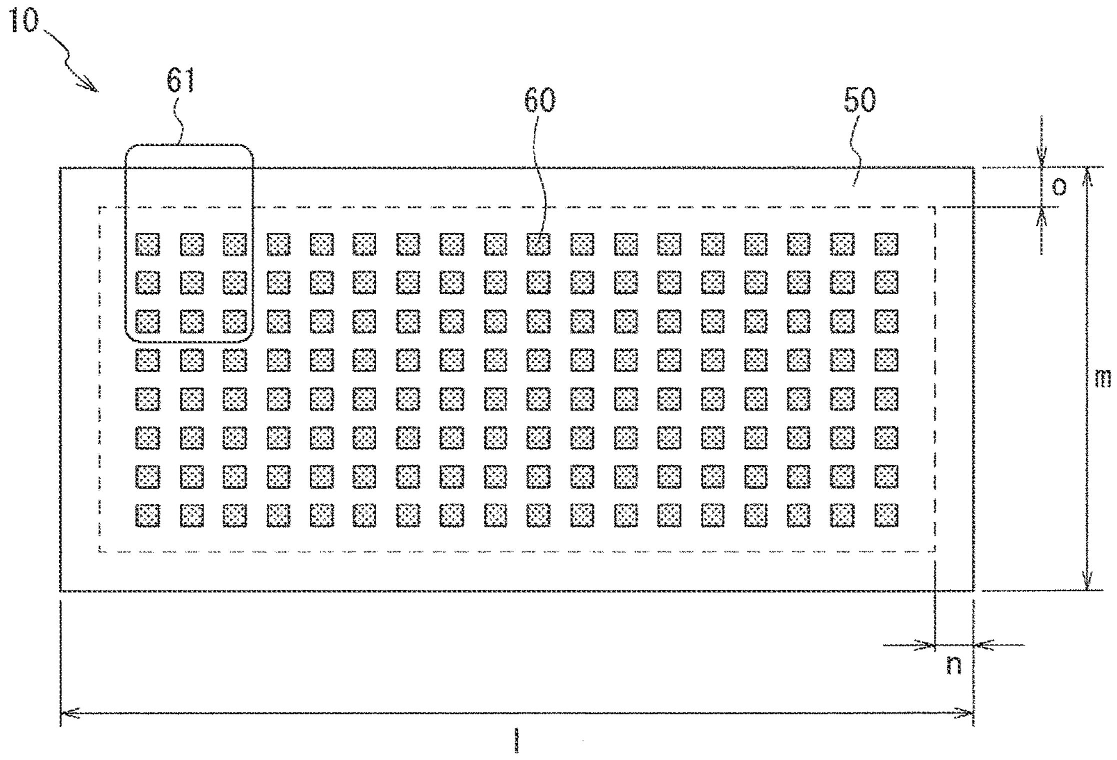
FIG. 6 is a plan view of the radio wave absorber in FIG. 4.
Figure 7:
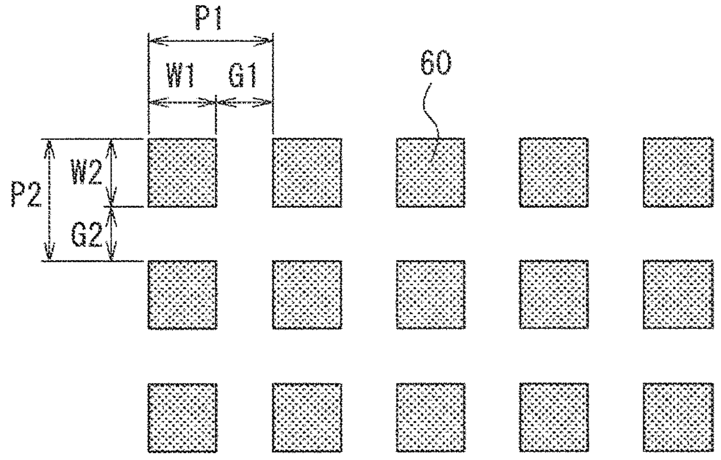
FIG. 7 is a plan view with part of the radio wave absorber in FIG. 6 enlarged.

(Arrangement of Protruding Parts 60 in FIG. 6 and FIG. 7)

The following describes the arrangement of the protruding parts 60 using FIG. 6 and FIG. 7.

As illustrated in FIG. 6, the protruding parts 60 are arranged on the almost entire ceiling face of the top part 50 in a two-dimensional, constant periodic manner.

As illustrated in FIG. 7, the protruding parts 60 each have widths of W1 and W2, each having a transverse gap G1 and a longitudinal gap G2, and are arranged in a two-dimensional manner with a transverse period P1 and a longitudinal period P2.

The term "periodic" is not limited to all of the protruding parts 60 and also includes a case in which they have periodicity with a partial group 61 of the protruding parts 60 as a unit.

(Method for Manufacturing Radio Wave Absorber 10)

In a method for manufacturing the radio wave absorber 10, the radio wave absorbing member 30 is manufactured by a method integrally molding with a synthetic resin using a mold.

It is also possible to integrally mold the radio wave absorbing member 30 and the base part 20. In this process, by performing molding with one to three faces of the side part 40 positioned on the four sides open, the radio wave absorbing member 30 and the base part 20 can be integrally molded.

All of the side part 40, the top part 50, the protruding parts 60, and the engaging part of the radio wave absorbing member 30, that is, the four members may be integrally molded, or they may be individually molded and fixed together with an adhesive or the like.

In addition, the three members except for the engaging part may be integrally molded, while one member, or the engaging part, may be separately molded and fixed to the side part 40 with an adhesive or the like. In addition, the two members, or the top part 50 and the protruding parts 60 except for the side part 40 and the engaging part, may be integrally molded, while the remaining two members, or the side part 40 and the engaging part, may be separately molded and fixed to the top part 50 with an adhesive or the like. In this process, the remaining two members, or the side part 40 and the engaging part, may be integrally molded or individually molded and fixed together with an adhesive or the like.

(Type of Synthetic Resin)

As to the type of the synthetic resin, basically the type of the resin does not matter, and as an insulating material, polypropylene is used, for example. In order for the synthetic resin to have the absorption characteristics of radio waves, a target material can be obtained by adding a conductive filler to the insulating material.

Examples of the insulating material include, apart from polypropylene, low-density polyethylenes, high-density polyethylenes, i-polypropylene, petroleum resins, polystyrene, s-polystyrene, cumarone-indene resins, terpene resins, styrene-divinyl benzene copolymers, ABS resins, polymethyl acrylate, polyethyl acrylate, polyacrylonitrile, methyl methacrylate, ethyl methacrylate, polycyano acrylate, polyvinyl acetate, polyvinyl alcohol, polyvinyl formal, polyvinyl acetal, polyvinyl chloride, vinyl chloride-vinyl acetate copolymers, vinyl chloride-ethylene copolymers, polyvinylidene fluoride, vinylidene fluoride-ethylene copolymers, vinylidene fluoride-propylene copolymers, 1,4-trans-polybutadiene, polyoxymethylene, polyethylene glycol, polypropylene glycol, phenol-formalin resins, cresol-formalin resins, resorcinol resins, melamine resins, xylene resins, toluene resins, glyptal resins, modified-glyptal resins, polyethylene terephthalate, polybutylene terephthalate (PBT), unsaturated polyester resins, allyl ester resins, polycarbonate, polyamides such as 6-nylon, 6,6-nylon, and 6,10-nylon, polybenzimidazole, polyamideimide, silicone resin, silicone rubbers, silicone resins, furan resins, polyurethane resins, epoxy resins, polyphenylene oxide, polydimethylphenylene oxide, polyphenylene oxide or polydimethylphenylene oxide and triallyl isocyanurate blends, (polyphenylene oxide or polydimethylphenylene oxide, triallyl isocyanurate, and peroxide) blends, polyxylene, polyphenylene sulfide (PPS), polysulfone (PSF), polyethersulfone (PES), polyetheretherketone (PEEK), polyimide (PPI and Kapton), liquid crystal resins, and blends of multiple materials of these.

Figure 8:
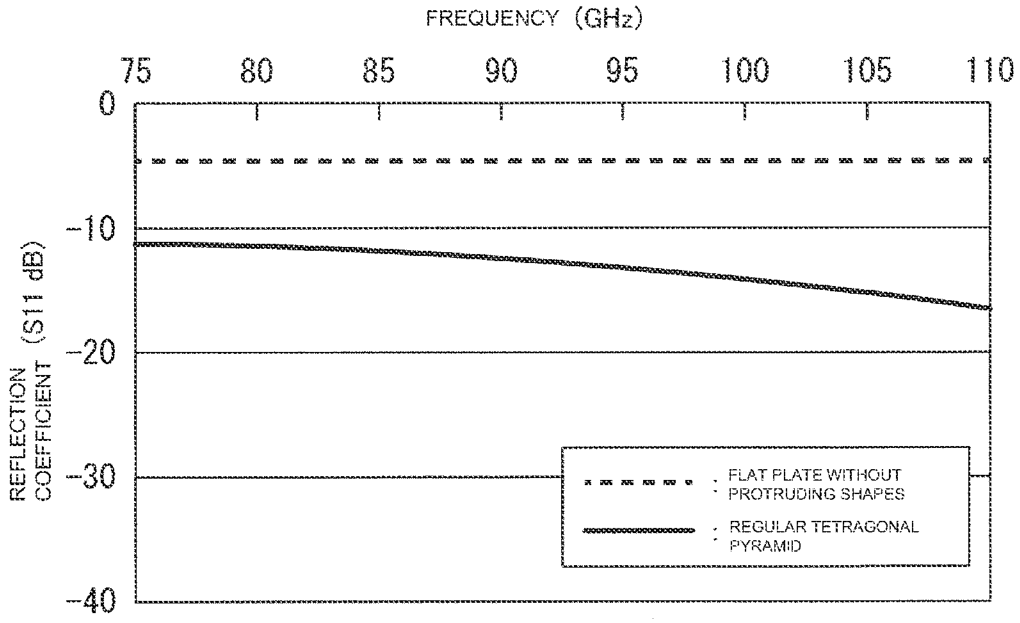
FIG. 8 is a chart for describing the relation between a reflection coefficient and a frequency about the shape of protruding parts, relating to the embodiment of the present invention.

(Chart on Shape of Protruding Parts 60 in FIG. 8)

The chart in FIG. 8 is for describing the relation between a reflection coefficient (dB) and a frequency (GHz) about the shape of the protruding parts 60.

As the shape of the protruding parts 60, a regular tetragonal pyramid of the present embodiment and a conventional flat plate without protruding shapes were used.

A comparison revealed that the reflection coefficient remained at "−4 dB" for the case of the flat plate without protruding shapes, whereas the reflection coefficient gradually improved from "−11 dB" for the case of the regular tetragonal pyramid of the present embodiment.

Thus, it can be inferred that when the shape of the protruding parts 60 is the regular tetragonal pyramid, the reflection characteristics of radio waves can be improved compared to the case of the flat plate without protruding shapes.

Figure 9:
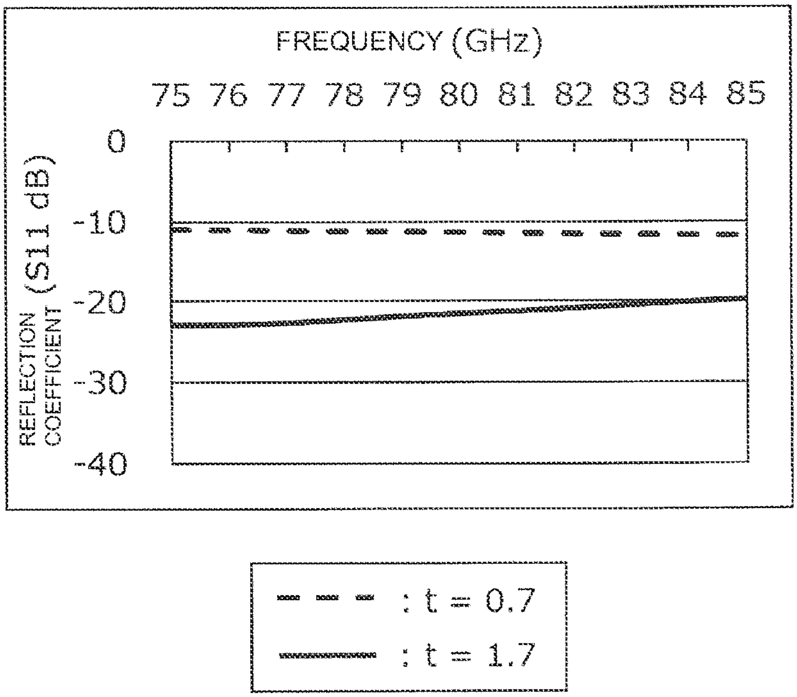
FIG. 9 is a chart for describing the relation between the reflection coefficient and the frequency about the height of the protruding parts, relating to the embodiment of the present invention.

(Chart on Height of Protruding Part 60 in FIG. 9)

The chart in FIG. 9 is for describing the relation between the reflection coefficient (dB) and the frequency (GHz) about the height of the protruding parts 60.

For the height of the protruding parts 60, a height t=0.7 mm and a height t=1.7 mm were used.

Consequently, the reflection coefficient was almost constant at "−11 dB" for the height t=0.7 mm, whereas the reflection coefficient gradually decreased from "−22 dB" toward "−19 dB" for the height t=1.7 mm.

Thus, it can be inferred that when the height t of the protruding parts 60 is increased, the reflection characteristics of radio waves can be improved.

(Another Chart on Height of Protruding Parts 60 in FIG. 10)

The chart in FIG. 10 is for describing the relation between a transmission coefficient (dB) and the frequency (GHz) about the height of the protruding parts 60.

For the height of the protruding parts 60, a height t=0.7 mm and a height t=1.7 mm were used.

A comparison revealed that the transmission coefficient gradually improved from "−40 dB" toward "−45 dB" for the height t=0.7 mm, whereas the transmission coefficient gradually improved from "−42 dB" toward "−51 dB" for the height t=1.7 mm.

Thus, it can be inferred that the transmission characteristics of radio waves can be improved when the height t of the protruding parts 60 is increased.

Figure 11:
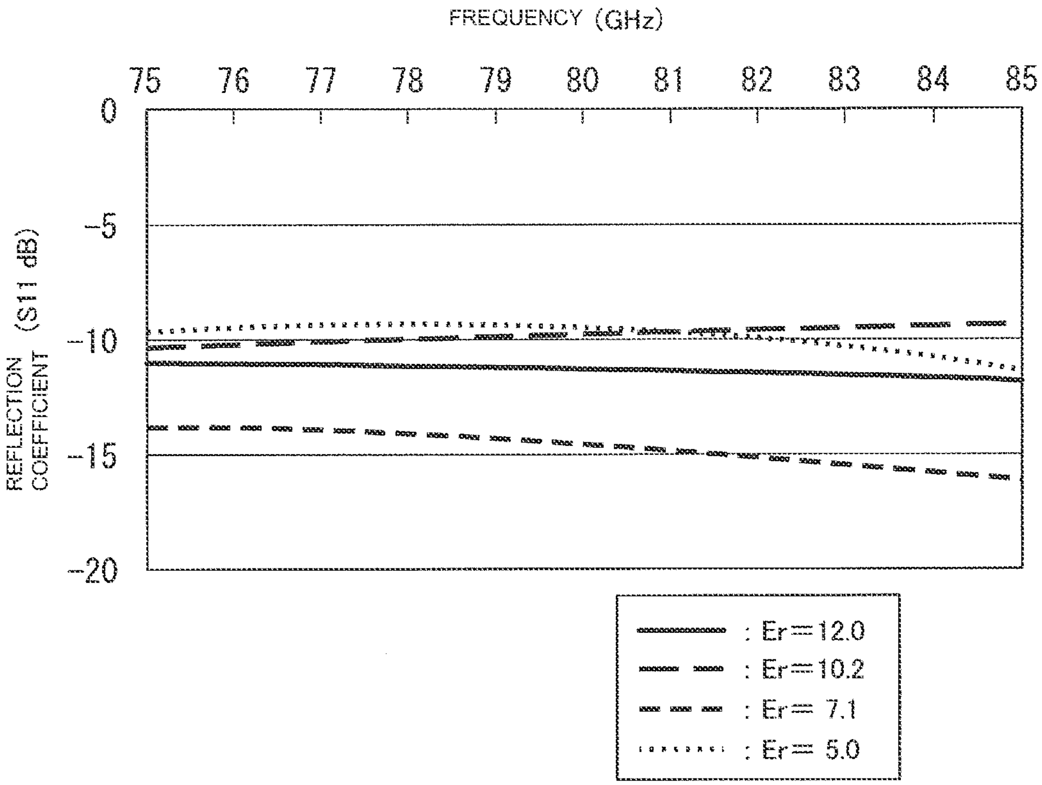
FIG. 11 is a chart for describing the relation between the reflection coefficient and the frequency about the relative permittivity of the protruding parts, relating to the embodiment of the present invention.

(Another Chart on Relative Permittivity of Protruding Parts 60 in FIG. 11)

The chart in FIG. 11 is for describing the relation between the reflection coefficient (dB) and the frequency (GHz) about the relative permittivity (Er) of the material of the protruding parts 60. The relative permittivity (Er) is the ratio of the dielectric constant of a medium to the dielectric constant of a vacuum.

For the value of the relative permittivity (Er) of the material of the protruding parts 60, the following ones were used.

(1) The relative permittivity (Er) is 12.0 (hereafter "Er=12.0") and the material is a "dielectric loss material."

(2) The relative permittivity (Er) is 10.2 (hereafter "Er=10.2") and the material is a "dielectric loss material."

(3) The relative permittivity (Er) is 7.1 (hereafter "Er=7.1") and the material is a "dielectric loss material."

(4) The relative permittivity (Er) is 5.0 (hereafter "Er=5.0") and the material is a "dielectric loss material."

For Er=12.0, the reflection coefficient was almost constant at "−11 dB."

For Er=10.2, the reflection coefficient was almost constant at "−10 dB."

For Er=7.1, the reflection coefficient gradually improved from "−13 dB" toward "−16 dB."

For Er=5.0, the reflection coefficient gradually improved from "−9 dB" toward "−11 dB."

Thus, a lower relative permittivity (Er) of the protruding parts 60 generally provides a higher reflection coefficient of radio waves.

Figure 12:
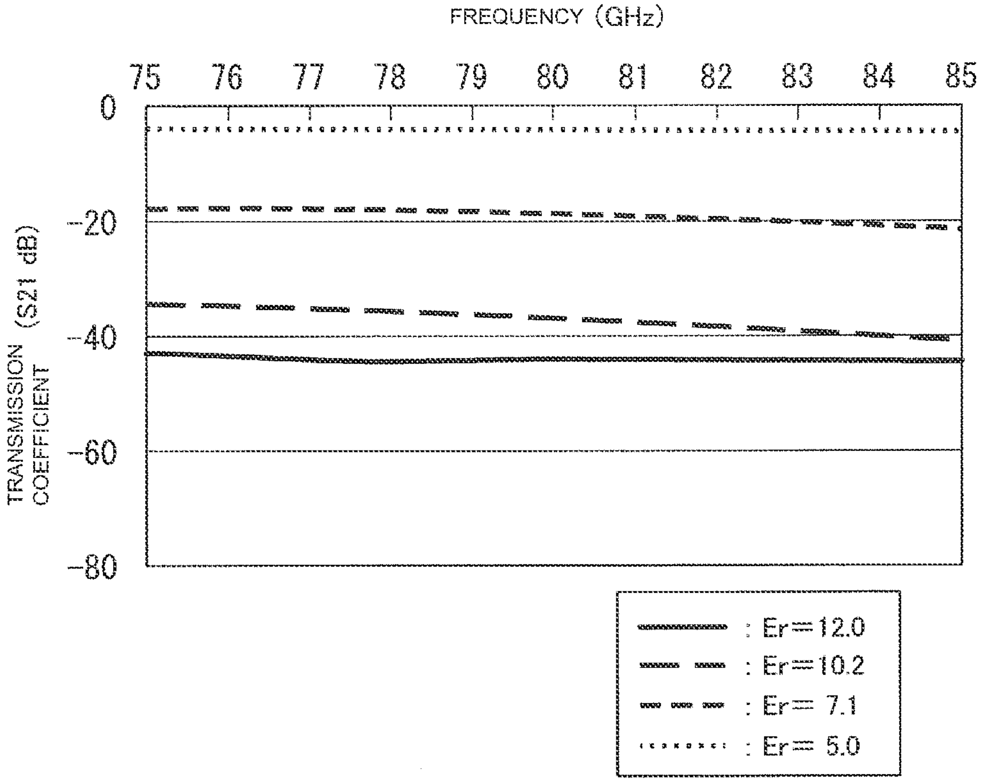
FIG. 12 is a diagram for describing the relation between the transmission coefficient and the frequency about the relative permittivity of the protruding parts, relating to the embodiment of the present invention.

(Another Chart on Relative Permittivity of Protruding Parts 60 in FIG. 12)

The chart in FIG. 12 is for describing the relation between the transmission coefficient (dB) and the frequency (GHz) about the relative permittivity (Er) of the material of the protruding parts 60 under the same conditions as in FIG. 11.

For Er=12.0, the reflection coefficient was almost constant at "−44 dB."

For Er=10.2, the reflection coefficient gradually improved from "−34 dB" toward "−40 dB."

For Er=7.1, the reflection coefficient gradually improved from "−13 dB" toward "−16 dB."

For Er=5.0, the reflection coefficient was almost constant at "−4 dB."

Thus, a higher relative permittivity (Er) of the protruding parts 60 provides a higher transmission coefficient of radio waves.

(First Feature Point of Embodiment)

A first feature point of the radio wave absorber 10 for the high-frequency communication apparatus 100 according to the embodiment is the radio wave absorber 10 for the high-frequency communication apparatus 100 absorbing unwanted radiated radio waves of a millimeter wave radar or the like to reduce radio wave interference with the semiconductor element 110 inside the high-frequency communication apparatus 100, the radio wave absorber 10 including the side part 40 surrounding the semiconductor element 110 fixed to the base part 20 provided in the high-frequency communication apparatus 100 and the top part 50 closing the open face surrounded by the side part 40, the inner face of the top part 50 being provided with the protruding parts 60 protruding toward the semiconductor element 110 positioned inside the radio wave absorber 10, positioned to be spaced apart from the semiconductor element 110, and periodically arranged, and the protruding parts 60 being formed tapered toward the semiconductor element 110 and being integrally molded of the synthetic resin.

(Effect of First Feature Point)

According to the first feature point, by forming the protruding parts 60 tapered toward the semiconductor element 110 and integrally molding them of the synthetic resin, the absorption characteristics of unwanted radiated radio waves can be obtained even with the protruding parts 60 made of resin on a par with conventional metallic protrusions (refer to Paragraph and FIG. 1 and FIG. 4 of Patent Literature 1).

According to an aspect of the present invention, the mass productivity of the radio wave absorber 10 can be improved, costs can be reduced, and further weight reduction can be achieved as compared with the conventional metallic protrusions.

Furthermore, according to an aspect of the present invention, by making the protruding parts made of resin, they are not affected by oxidation, and variations in mass production and changes with time of the radio wave absorber 10 can be reduced.

(Second Feature Point of Embodiment)

A second feature point of the radio wave absorber 10 according to the embodiment is that the protruding parts 60 protrude in a regular polygonal pyramidal shape, a conical shape, or a hemispherical shape toward the semiconductor element 110.

(Effect of Second Feature Point)

According to the second feature point, by employing the regular polygonal pyramidal shape, the conical shape, or the hemispherical shape for the protruding parts 60, the reflection coefficient can be −10 dB or less as illustrated in FIG. 8 compared with a conventional rectangular parallelepiped one (Paragraph of Patent Literature 1).

(Third Feature Point of Embodiment)

A third feature point of the radio wave absorber 10 according to the embodiment is that the top part 50 and the protruding parts 60 are integrally molded of the synthetic resin.

(Effect of Third Feature Point)

According to the third feature point, by integrally molding the top part 50 and the protruding parts 60 of the synthetic resin, the manufacturing of the radio wave absorber 10 can be simplified.

(Fourth Feature Point of Embodiment)

A fourth feature point of the radio wave absorber 10 according to the embodiment is that the top part 50, the protruding parts 60, and the side part 40 are integrally molded of the synthetic resin.

(Effect of Fourth Feature Point)

According to the fourth feature point, by integrally molding the top part 50, the protruding parts 60, and the side part 40 of the synthetic resin, the manufacturing of the radio wave absorber 10 can be further simplified.

In addition, even for the height of the semiconductor element 110 and the height of the protruding parts 60, which vary depending on specifications, by changing the length of the side part 40, the spacing between the top part 50 and the semiconductor element 110 can be easily set or changed.

(Fifth Feature Point of Embodiment)

A fifth feature point of the radio wave absorber 10 according to the embodiment is that the side part 40 is provided with the engaging part for mounting on the base part 20.

(Effect of Fifth Feature Point)

According to the fifth feature point, the base part 20 can be mounted by means of the engaging part of the side part 40, and thus assembly of the radio wave absorber 10 can be performed simply and quickly. Mounting means such as screws and adhesives are not necessary for mounting on the base part 20, thus contributing to a reduction in the number of components.

(Sixth Feature Point of Embodiment)

A sixth feature point of the radio wave absorber 10 according to the embodiment is that the protruding parts 60 have a protruding height from the inner face of the top part 50 to the tip part of 0.1 mm or more and 2.0 mm or less.

(Effect of Sixth Feature Point)

According to the sixth feature point, this is because if the protruding height is less than 0.1 mm, it is difficult to fill a recess of a mold with resin 100% during injection molding. The height h of the gap between the base part 20 and the top part 50 is preferably 22 or less; for “A=76.5 GHz,” λ is “4 mm” and h is “2 mm”.

Thus, this is because if the protruding height exceeds 2.0 mm, the protruding parts 60 cannot be placed within the height h of the gap. The height h of the protruding parts 60 is preferably 1.0 mm or less.

(Seventh Feature Point of Embodiment)

A seventh feature point of the radio wave absorber 10 according to the embodiment is that the protruding parts 60 have a relative permittivity of their material of 4 or more and 26 or less.

(Effect of Seventh Feature Point)

According to the seventh feature point, if the relative permittivity becomes less than “4,” the transmission characteristics of radio waves approach “0 dB” as illustrated in FIG. 12, and the transmission characteristics of radio waves are too low.

That is, when radio waves are generally applied to a resin flat plate, some of the radio waves are reflected on the surface to return, causing a problem.

Given this, the protruding shapes of the present embodiment (the protruding parts 60) have a role of preventing reflection by allowing radio waves to gradually enter the inside of the material by repeating reflection many times between the slopes of adjacent protruding shapes.

In order for the radio waves having entered to be converted into thermal energy within the material and in order not to transmit the radio waves, a material with a high dielectric constant is required.

This is the reason why a material with a high dielectric constant is selected for the purpose of absorption (to extinguish radio waves inside the material without transmitting them).

On the other hand, when a material with a low dielectric constant patented by another company is used, radio waves are transmitted inside the material without being changed into thermal energy. In this case, the objective is to prevent surface reflection and improve transmittance. This is an event that a radar cover is required.

If the relative permittivity exceeds “26,” it becomes difficult to select the material of the protruding parts 60.

REFERENCE SIGNS LIST

10 RADIO WAVE ABSORBER
20 BASE PART
30 RADIO WAVE ABSORBING MEMBER
40 SIDE PART
50 TOP PART
60 PROTRUDING PART
61 GROUP
70 ENGAGING PART
71 LOCKING CLAW
72 ENGAGING HOLE
100 HIGH-FREQUENCY COMMUNICATION APPARATUS
110 SEMICONDUCTOR ELEMENT
120 ANTENNA
130 RADOME

What is claimed is:

1. A radio wave absorber for a high-frequency communication apparatus absorbing unwanted radiated radio waves of a millimeter wave radar to reduce radio wave interference with a semiconductor element inside the high-frequency communication apparatus, the radio wave absorber comprising:

a side part surrounding the semiconductor element configured to be fixed to a base part provided in the high-frequency communication apparatus; and a top part closing an open face surrounded by the side part, an inner face of the top part being provided with a plurality of protruding parts configured to protrude toward the semiconductor element positioned inside the radio wave absorber, positioned to be spaced apart from the semiconductor element, and periodically arranged, and the protruding parts being formed to be tapered toward the semiconductor element and being integrally molded of a synthetic resin, wherein each of the protruding parts has a first and second widths, each having a transverse gap and a longitudinal gap, and the first and second widths and the transverse gap and the longitudinal gap are arranged in a two-dimensional manner with a transverse period and a longitudinal period.

2. The radio wave absorber for a high-frequency communication apparatus according to claim 1, wherein the protruding parts protrude in a regular polygonal pyramidal shape or a conical shape toward the semiconductor element.

3. The radio wave absorber for a high-frequency communication apparatus according to claim 1, wherein the top part and the protruding parts are integrally molded of a synthetic resin.

4. The radio wave absorber for a high-frequency communication apparatus according to claim 3, wherein the side part is provided with an engaging part for mounting on the base part.

5. The radio wave absorber for a high-frequency communication apparatus according to claim 3, wherein the protruding parts have a protruding height from the inner face of the top part to a tip part of 0.1 mm or more and 2.0 mm or less.

6. The radio wave absorber for a high-frequency communication apparatus according to claim 3, wherein the protruding parts have a relative permittivity of a material of the protruding parts of 4 or more and 26 or less.

7. The radio wave absorber for a high-frequency communication apparatus according to claim 1, wherein the top part, the protruding parts, and the side part are integrally molded of a synthetic resin.

8. The radio wave absorber for a high-frequency communication apparatus according to claim 7, wherein the side part is provided with an engaging part for mounting on the base part.

9. The radio wave absorber for a high-frequency communication apparatus according to claim 7, wherein the protruding parts have a protruding height from the inner face of the top part to a tip part of 0.1 mm or more and 2.0 mm or less.

10. The radio wave absorber for a high-frequency communication apparatus according to claim 4, wherein the protruding parts have a relative permittivity of a material of the protruding parts of 4 or more and 26 or less.

11. The radio wave absorber for a high-frequency communication apparatus according to claim 1, wherein the top part, the protruding parts, and the side part are integrally molded of a synthetic resin.

12. The radio wave absorber for a high-frequency communication apparatus according to claim 1, wherein the side part is provided with an engaging part for mounting on the base part.

13. The radio wave absorber for a high-frequency communication apparatus according to claim 12, wherein the protruding parts have a protruding height from the inner face of the top part to a tip part of 0.1 mm or more and 2.0 mm or less.

14. The radio wave absorber for a high-frequency communication apparatus according to claim 12, wherein the protruding parts have a relative permittivity of a material of the protruding parts of 4 or more and 26 or less.

15. The radio wave absorber for a high-frequency communication apparatus according to claim 1, wherein the protruding parts have a protruding height from the inner face of the top part to a tip part of 0.1 mm or more and 2.0 mm or less.

16. The radio wave absorber for a high-frequency communication apparatus according to claim 15, wherein the protruding parts have a relative permittivity of a material of the protruding parts of 4 or more and 26 or less.

17. The radio wave absorber for a high-frequency communication apparatus according to claim 1, wherein the protruding parts have a relative permittivity of a material of the protruding parts of 4 or more and 26 or less.

18. The radio wave absorber for a high-frequency communication apparatus according to claim 1, wherein the radio wave absorber further comprising a base part and a top part, and a height of a gap between the base part and the top part is $\lambda/2$ or less, where $\lambda$ represents a wavelength of a high-frequency communication of the high-frequency communication apparatus.

19. The radio wave absorber for a high-frequency communication apparatus according to claim 1, wherein a height of the protruding parts is ranging from 0.1 mm to 1.0 mm.

20. The radio wave absorber for a high-frequency communication apparatus according to claim 1, wherein the protruding parts have a relative permittivity of a material of the protruding parts ranging from 5.0 to 7.1.

* * * * *